F. G. S. PRICE.
METALLIC JOINT AND PROCESS OF MAKING THE SAME.
APPLICATION FILED APR. 18, 1913.

1,067,755.

Patented July 15, 1913.

Witnesses
M E Rathvon
S. H. Carpenter

Inventor
Francis George Symmonds Price
By Edwin Calvert
Attys.

UNITED STATES PATENT OFFICE.

FRANCIS GEORGE SYMMONDS PRICE, OF GLASGOW, SCOTLAND.

METALLIC JOINT AND PROCESS OF MAKING THE SAME.

1,067,755.  Specification of Letters Patent.  Patented July 15, 1913.

Application filed April 18, 1913. Serial No. 762,073.

*To all whom it may concern:*

Be it known that I, FRANCIS GEORGE SYMMONDS PRICE, a subject of the King of the United Kingdom of Great Britain and Ireland, and residing at Scotstounhill, Glasgow, Scotland, have invented a certain new and useful Metallic Joint and Process of Making the Same, of which the following is a specification.

This invention has for its object the production of a waterproof and protective joint at the bolt or rivet holes of two or more metal sheets or the like, by molding within the registering holes a deformable ferrule the ends of which when molded are maintained in direct engagement with the nut and head of the bolt or closed ends of the rivet or interposed washers.

In accordance with the invention I compress between the nut and head of the bolt or between the closed ends of the rivet or interposed washers or caps a ferrule of lead or other deformable but substantially non-elastic material, which is preferably of hollow bulbous or tapering shape, which ferrule is entered into or placed over the registering bolt or rivet holes and is given its preferred ultimate permanent form—*e. g.*, that of a double-flanged eyelet-shaped member, *i. e.*, a tube having both ends expanded or spread out—by the pressure applied in securing the bolt or rivet in place, the ferrule being thereby squeezed into both holes surrounding the shank of the bolt or rivet and lining the entire depth of both holes and becoming swelled or upset at its extremities so that the outer surface of each hole receives a protective coat of lead or other material of which the ferrule is formed, each hole being at the same time entirely choked by the shank of the bolt and molded ferrule. The said ferrule may of itself constitute a separate article, or may be clenched or soldered to, or cast on, or otherwise secured to a hard metal annulus or washer, or may be fixed to, or formed on, the bolt or rivet, and may be used alone or in conjunction with a cap which is fitted on the side of the sheet opposite to that at which the ferrule is inserted.

The invention is illustrated in the accompanying drawings in which—

Figure 1:
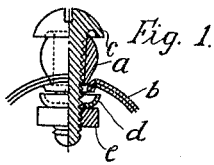
Figure 2:
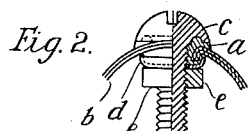
Figure 3:
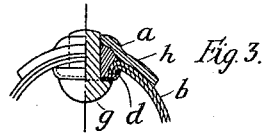
Figure 4:
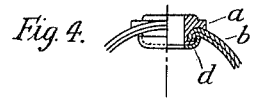
Figure 5:
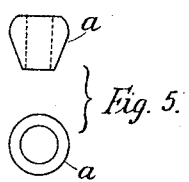
Figure 6:
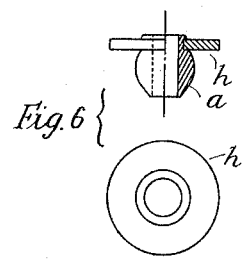
Figure 7:
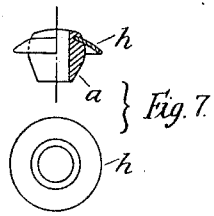
Figure 8:
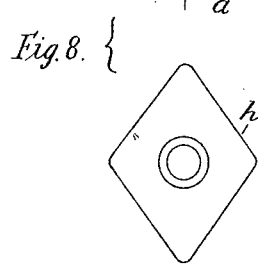
Figure 9:
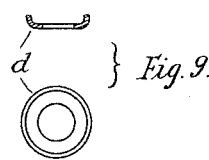
Figure 10:
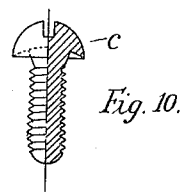
Figure 11:
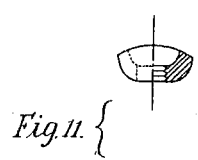

Figure 1 is a part elevation part vertical section showing a bolt fitted into a pair of corrugated sheets and about to be tightened up, the ferrule still retaining its penultimate form. Fig. 2 is a like view, showing the bolt screwed home. Fig. 3 shows a ferrule associated with an embossed washer used in conjunction with a rivet. Fig. 4 shows a ferrule and its associated cap in section. Fig. 5 shows one construction of ferrule in plan and elevation. Fig. 6 shows a ferrule fixed to a flat metal annulus. Fig. 7 shows a ferrule fixed to a concave or dome-shaped metal annulus. Fig. 8 shows a ferrule fixed to an arched and embossed hard metal washer. Fig. 9 shows a cap in vertical section and in plan. Fig. 10 shows a construction in which the bolt head is of arched section. Fig. 11 shows a cap combined with a nut.

Similar reference characters denote similar parts in the several views.

Referring to Fig. 1, it will be observed that the ferrule $a$ which is of lead or other readily deformable but substantially non-elastic material is—before it is finally formed into an eyelet—of hollow bulbous shape, tapering toward the ends in the direction of the axis of the registering holes in the corrugated sheets $b$. The bolt $c$ which has a loose fit in the holes has been strung through the ferrule $a$ and slipped into the holes from above, the under cap $d$ being strung on and the nut $e$ being screwed on to the lower end of the bolt $c$.

As appears from Fig. 2, when the nut $e$ is tightened on the bolt $c$, the upper face of the under cap $d$ is pressed hard against the face of the under sheet $b$ and the ferrule $a$ forced into the bolt holes and squeezed into the form of a double-flanged eyelet-shaped member; that is, the lead has been caused to flow and become molded around that part of the bolt shank which is within the holes and the ends of the ferrule are nipped between the flange on the head of the bolt and the upper sheet and between the cavity of the under cap and the lower sheet. The ferrule being of non-elastic material retains its form after it is molded *in situ.*

The ferrule, when it receives the form shown in Fig. 2, affords a lining for the holes where the protective coat of galvanizing has been destroyed by the punching operation, the lead sheathing the naked metal and affording protection against corrosion. The lead is also tightly clenched around the bolt shank, and the joints formed between the contacting surfaces are effectively lead-lined or sheathed and rendered impervious to moisture under all conditions.

In the preferred construction shown in Figs. 1 and 2 the head of the bolt is recessed on the under side in order more perfectly to mold the lead into a rim. The bolt head may, however, be made without a groove or may be of arched section as shown in Fig. 10. The addition of a hard metal annulus or washer $h$ (Figs. 3, 6, 7 and 8) is preferred, particularly in use with bolts or rivets connecting the sheets to the framework. The embossed metal cap on the underside serves to hold and mold the extruded end of the ferrule and the projecting rag, if any, of the punched metal sheets, but it is understood that the cap may be formed integral with the nut and have a convex upper face—this last arrangement being shown in Fig. 11.

It is understood that when a rivet $g$ is employed in lieu of a bolt—as in the case of the construction illustrated in Fig. 3—the ferrule may be made of a tough alloy of lead to withstand the severe action of riveting; but by embossing the hard metal washer and under cap provision is made for preventing the lead from extruding during the process of riveting as shown in Fig. 3 where $h$ is the embossed hard metal washer.

It will of course be understood that in every case the ferrule of deformable material is of greater cubical capacity than the annular space between the rigid shank of the bolt or rivet and the sides of the holes in the sheets being jointed, and that its ultimate form is imparted to the ferrule by the application of stress to the shank member of the bolt or rivet in axial direction while resisting the flow of the deformable material of the ferrule in said axial direction while permitting said material to flow outwardly in a direction transverse to said axial direction.

Having now particularly described my invention what I claim and desire to secure by Letters Patent of the United States is:—

1. The hereindescribed process of protecting the surfaces of bolt and rivet holes in joined metal sheets or the like consisting in entering into registering holes in a plurality of sheets a concentrically arranged ferrule of deformable material and a shank member of rigid material, said ferrule being of greater cubical capacity than the annular space between the shank member and the sides of the holes, applying stress in axial direction to the shank member and resisting the flow of the deformable material in said axial direction while permitting said deformable material to flow outwardly in a direction transverse to said axial direction.

2. The combination with a plurality of superposed apertured sheets, the apertures of the several sheets being in register, of a jointing member including a shank passing through the holes, and a ferrule surrounding said shank, said ferrule lining the entire depth of the holes and closing the outer end of each hole.

3. The combination with a plurality of superposed apertured sheets the apertures of the several sheets being in register, of a jointing member comprising a shank passing through the registering holes and having head portions at both ends, and a ferrule constituted by a tubular member strung over the shank portion and lining the holes, and flange members located respectively between the external faces of the upper and lower sheets and the said head portions.

In testimony whereof I have signed my name to this specification in the presence of two subscribing witnesses.

FRANCIS GEORGE SYMMONDS PRICE.

Witnesses:
  JOHN McCLEARY,
  THOMAS BISHOP GRAHAM.

Copies of this patent may be obtained for five cents each, by addressing the "Commissioner of Patents, Washington, D. C."